Jan. 1, 1946.  W. L. CHAMBERS  2,391,879
PROJECTION MACHINE
Filed Feb. 4, 1942  4 Sheets-Sheet 1

Inventor:
Worthy L. Chambers
By: Burton & Burton
Attorney.

Jan. 1, 1946. W. L. CHAMBERS 2,391,879
PROJECTION MACHINE
Filed Feb. 4, 1942 4 Sheets-Sheet 2

Inventor:
Worthy L. Chambers
By: Burton & Burton
Attorney

Jan. 1, 1946. W. L. CHAMBERS 2,391,879
PROJECTION MACHINE
Filed Feb. 4, 1942 4 Sheets-Sheet 3
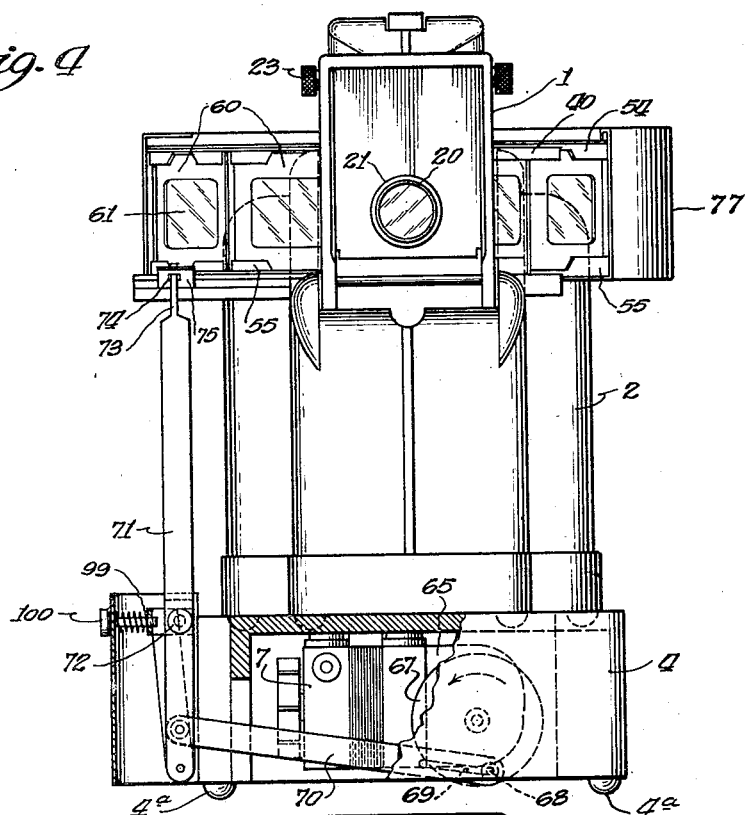
Fig. 4
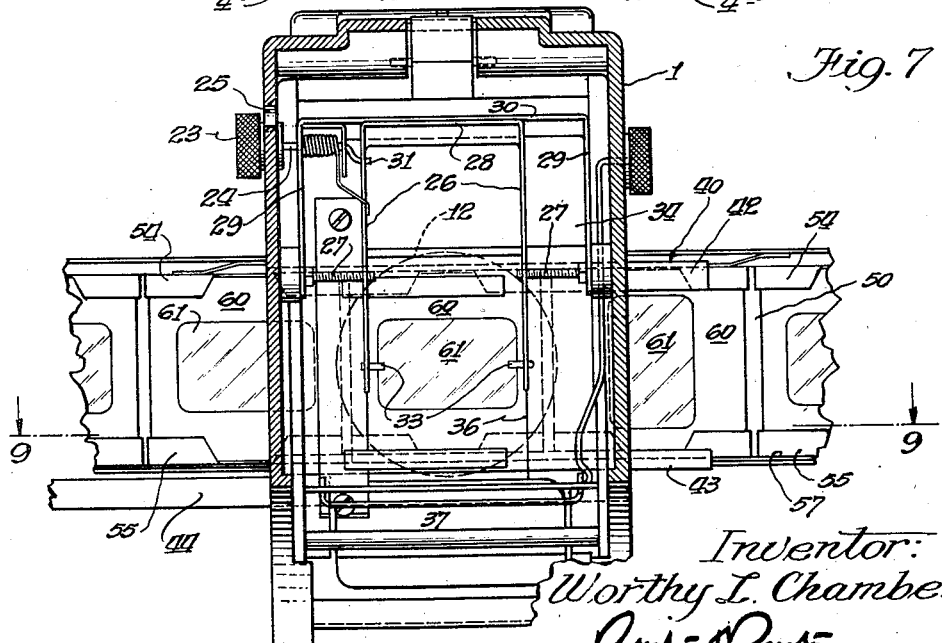
Fig. 7
Inventor:
Worthy L. Chambers
By: 
Attorney.

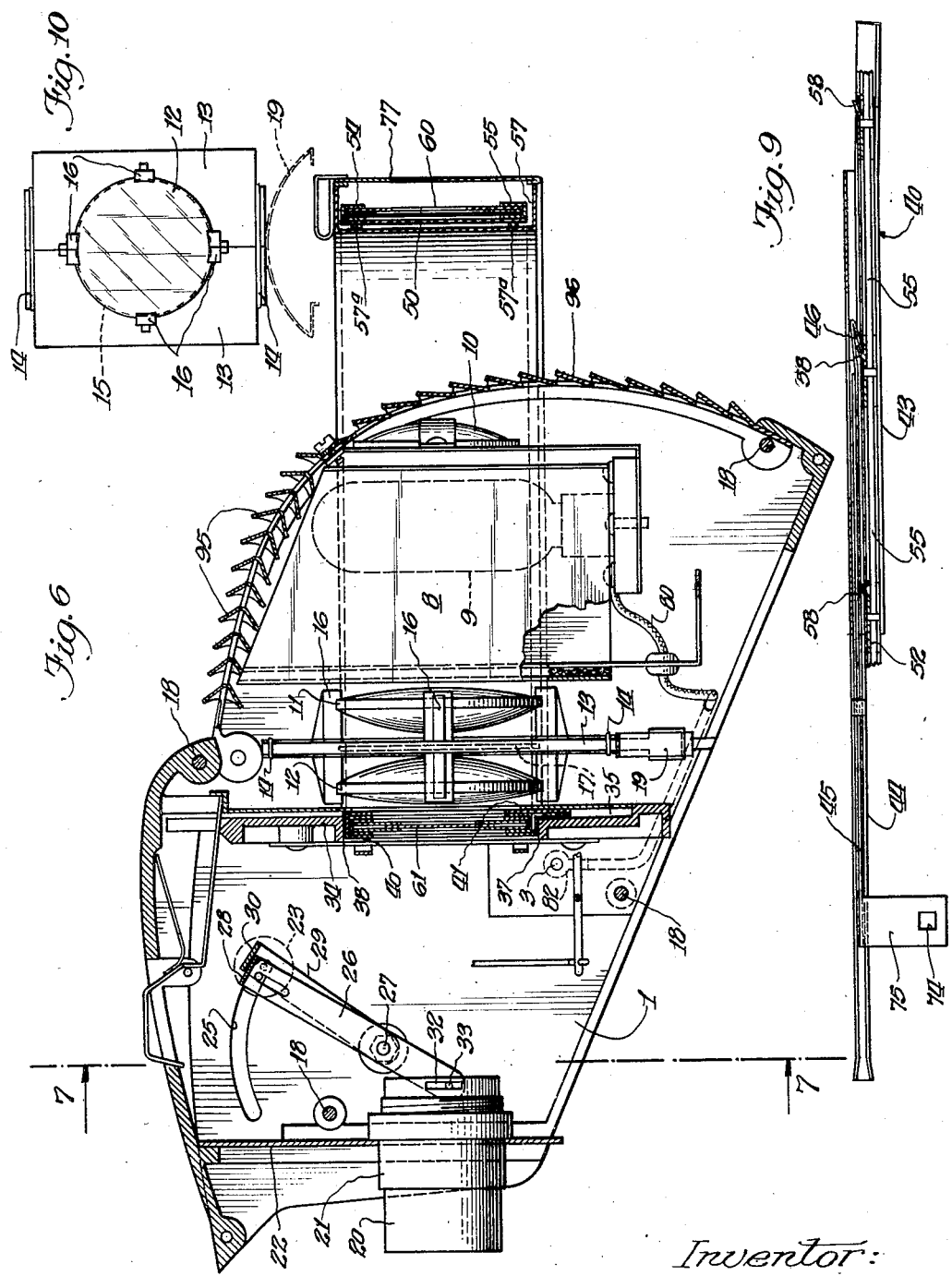

Patented Jan. 1, 1946

2,391,879

UNITED STATES PATENT OFFICE 2,391,879

PROJECTION MACHINE

Worthy L. Chambers, Chicago, Ill., assignor to Novex Corporation, Chicago, Ill., a corporation of Illinois Application February 4, 1942, Serial No. 429,534

9 Claims. (Cl. 88—24)

This invention relates to projectors of the type in which a transparent slide bearing a picture or message is positioned between a source of light and a focusing lens for projection of the resulting image in more or less enlarged form upon an adjacent screen.

One object of the invention is to provide a projection machine having a self-contained projection screen and a movably mounted projector including a lamp, a lens system, and a slide-receiving space, and adjustable either to project an image onto said screen or onto a distant screen separate from the machine.

Another object of the invention is to provide a projection machine in which the projector itself is tiltably mounted upon a hollow base structure containing a mirror and a translucent projection screen so arranged that an image may be projected onto the mirror and reflected onto said screen, or the projector may be adjusted to throw the image past the mirror onto a screen separate from the machine.

A further object of the invention is to provide a projection machine with an endless belt composed of slide carriers adapted to removably support a plurality of individual, translucent slides adapted for projection in the machine, together with a track or guide supporting such belt and means for advancing the belt intermittently for successive display of the slides.

And it is also an object of the invention to provide a projection machine with an endless belt of slide carriers, each adapted to removably support a transparent slide, together with automatic, motor driven means for advancing the belt intermittently to bring the slides successively into registration with the light source and lens system of the projector.

Other objects and advantages of the invention will appear from the following description taken in conjunction with the drawings, in which:

Fig. 4 is a front elevation with the parts positioned as in Fig. 1, and with the base structure partly broken away and shown in section to reveal the motor and drive connections therefrom.

Fig. 6 is a vertical sectional view of the projector unit taken on a larger scale than the preceding views, being taken as indicated at line 6—6 on Fig. 5.

Fig. 7 is a section taken substantially as indicated at line 7—7 of Fig. 6, but with some parts broken away.

Fig. 9 is a detail plan section of the slide guiding frame and feed mechanism, taken as indicated at line 9—9 on Fig. 7.

Fig. 10 is a detail face view of the condenser lens and the supporting frame therefor.

While there is shown and described herein certain specific structure embodying the invention, it will be manifest to those skilled in the art that various modifications and rearrangements of the parts may be made without departing from the spirit and scope of the invention, and that the same is not limited to the particular form herein shown and described, except in so far as indicated by the appended claims.

Figure 1:
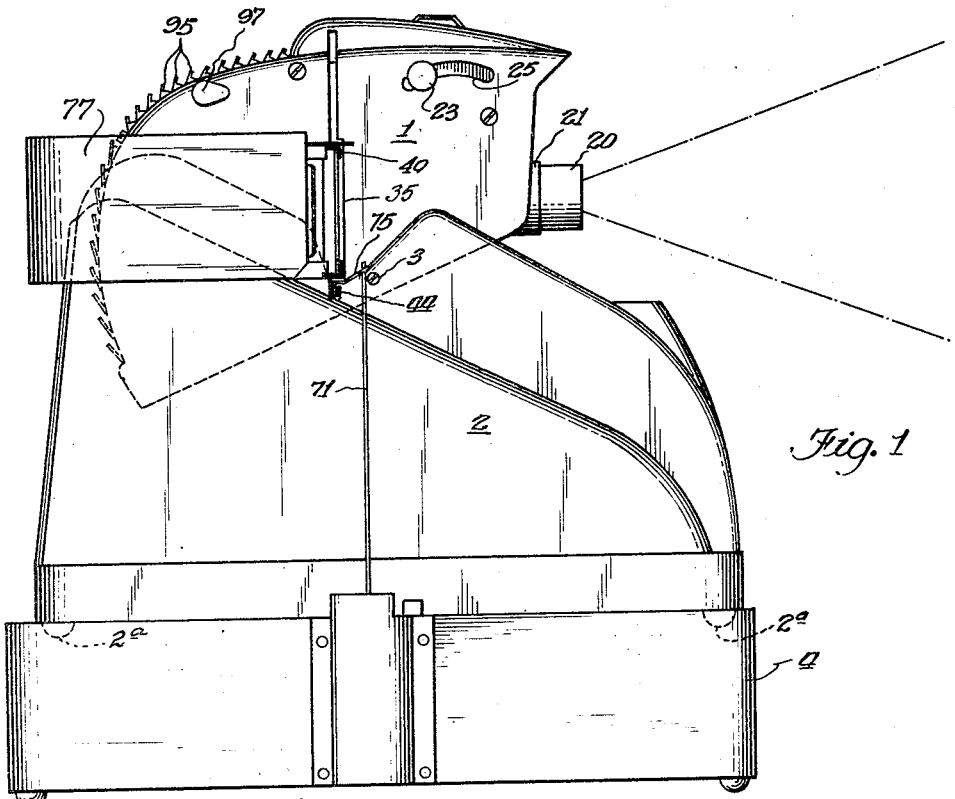
Fig. 1 is a side elevation of the projection machine embodying this invention, showing the projector unit tilted to horizontal position for throwing an image onto a screen separate from the machine.
Figures 3, 8:
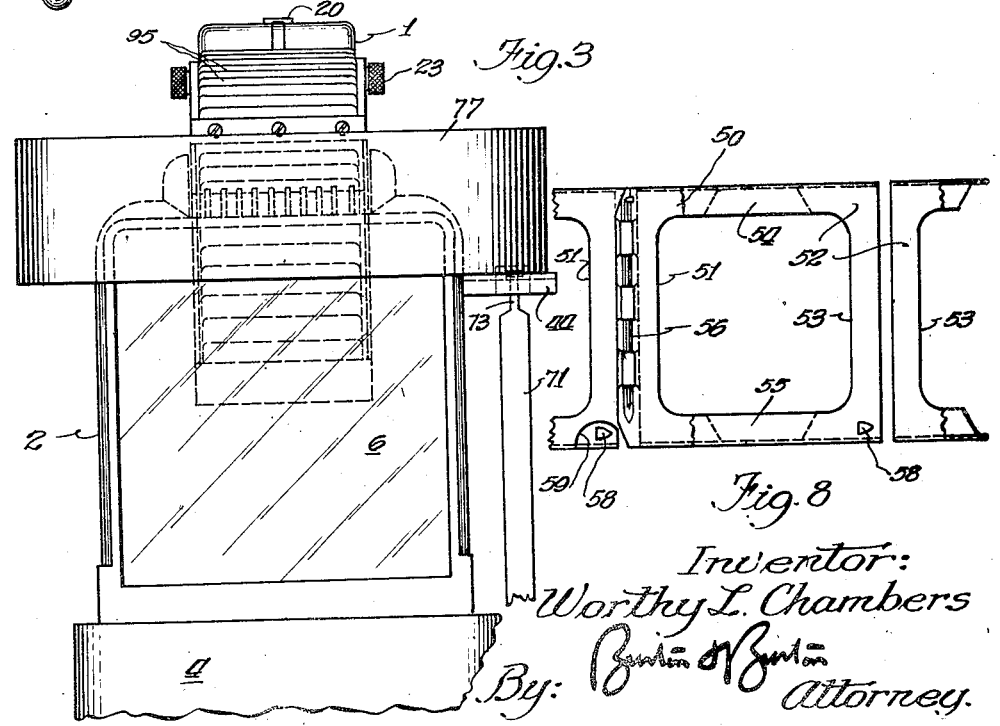
Fig. 3 is a rear elevation of the machine with the parts positioned as shown in Fig. 1, and with a portion of the base broken away.
Fig. 8 is a fragmentary rear elevation of the endless belt and its slide holding frames.
Figure 2:
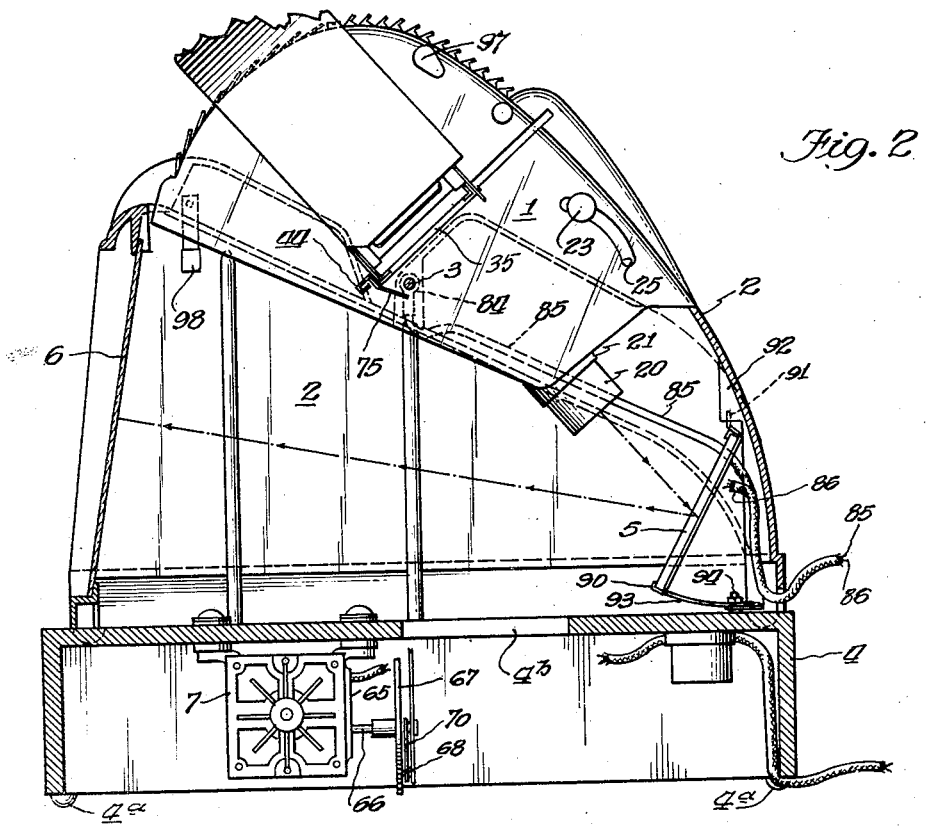
Fig. 2 is a side elevation of the projector with the supporting housing and base structure shown in section and with the projector tilted downwardly for cooperation with the mirror and projection screen carried by said housing.

As illustrated in the drawings, the projection machine embodied in this invention may be considered as comprising three principal units, namely, the projector unit proper shown at 1 in Fig. 1, the supporting housing 2 on which the unit 1 is tiltably mounted by means of pivots 3, and finally the base 4 which contains the driving motor for the slide shifting mechanism. As seen in Fig. 2, the projector unit 1 may be tilted about its pivotal mounting at 3 so as to direct its focused beam onto a mirror 5 which is supported within the housing 2 at such an angle as to reflect the image onto a translucent screen 6, which may be of "ground glass" or like material. This viewing screen 6 is considerably larger than the transparency which is introduced into the projector in the form of a so-called "slide" and which may bear either a picture or a printed message. And it may be understood that although the machine includes an electric motor 7 disposed in the base 4 and is designed for the automatic shifting of a plurality of slides through the projector for their successive display, the housing 2 and the projector unit 1 may be removed from the base section 4 and may be employed independently of the automatic drive, the slides being shifted manually through the space provided for them in the projection unit 1. Whether the automatic motor driven shifting means is employed or not, the projection unit 1 may be tilted from its inclined position, shown in Fig. 2, to a substantially horizontal position, as shown in Fig. 1, for throwing the image onto a larger screen at a considerable distance from the projection machine when desired. Thus, in connection with sales work, the machine may be set on a desk or table, and can be operated by the salesman for displaying attractive pictures of his line of goods, and the projected enlargements of the pictures may be viewed by the prospect either at the translucent screen 6, or on any convenient area, such as the wall of his office, at a short distance away from the projector.

The projection unit 1, as shown in detail in Fig. 6, includes a lamp housing 8 in which a suitable electric lamp bulb, indicated at 9, is mounted in position between a reflector 10 and a condenser lens assembly consisting of two lenses 11 and 12 supported in a special frame which is shown in Fig. 10. The frame is rectangular in form and consists of two similar parts 13, 13 which are held together by spring clips 14, 14 and which, when assembled, form a circular opening 15 coaxial with the lenses 11 and 12. The lenses are supported in notched lugs 16 which project from the front and rear faces of the members 13, 13 and engage the edges of the lenses. Preferably the margin of the circular opening 15 is grooved to secure a tinted, transparent screen 17 in this opening, which serves to eliminate most of the heat rays from the light and thus to protect the transparencies which are to be projected. The projector unit 1 is a two-part shell, preferably of molded plastic material, with the two parts held together transversely by tie rods 18, and the side walls of this shell are provided with channels to engage the edges of the condenser support 13, 13. A bowed spring element 19 snapped into position between the side walls of the shell serves to hold the support in the channels, as shown in Fig. 6.

A suitable lens or lenses, not shown in detail but referred to as the "focusing lens," may be supported in a tube 20 which is slidably carried in a sleeve 21 fixed in the front wall 22 of the projector shell 1. For focusing the image, the tube 20 is shifted axially in the sleeve 21 by manipulation of a knob 23 carried at one side of the shell 1 with its stem or shank 24 extending into the shell through an arcuate slot 25. The stem 24 is engaged in the upper end of a lever 26 fulcrumed at 27 and connected at its lower end to the inner end of the lens tube 20. Preferably, this lever is formed in duplicate, as indicated in Fig. 7, with its two arms transversely connected by a portion 28 making the lever approximately of inverted U-shape, with its two portions 26 provided with separate fulcrum pins 27 engaging the side walls of the unit 1. In addition, a second yoke or lever is fulcrumed on the pins 27, with its duplicate members 29 extending upwardly therefrom and connected by a transverse portion 30 just above the part 28 of the lever 26. The shank 24 of the knob 23 is journaled in one of the lever arms 29 and the terminal portion of this shank is an offset crank 31 which engages one of the lever members 26. Thus the rotation of the knob 23 rotates the crank 31 to produce limited movement of the lower ends of the levers 26 about the fulcrum pins 27, but bodily movement of the shank 24 through the arcuate slot 25 swings the two levers 26 and 29 together to effect a greater range of movement of the lens tube 20. The inner end of the tube is formed with slots 32 and the lower ends of the lever members 26 are provided with pins 33 engaging said slots. To bring the image into focus on the screen, the operator shifts the knob 23 bodily through the slot 25 to the approximately correct position and then rotates the knob for the final adjustment to secure a perfect focus.

Between the condenser lenses 11, 12 and the focusing lens carried in tube 20, there is secured in the shell of the projector unit 1 a transverse partition or bulk head 34 which registers with slots 35 in the side walls, and which includes a rectangular opening 36 substantially centered with respect to the condenser and focusing lenses. At the upper and lower edges of this opening 36, the partition 34 is formed with horizontal shoulders 37 and 38 between which a transparent slide may be inserted, or a suitable slide holder may be secured for guiding the slides through the slide-receiving opening formed by the slots 35 and shoulders 37 and 38.

In the structure as illustrated, a guide frame 40 formed of sheet metal is secured in the slots 35 and extends through the unit 1 from side to side. This frame includes an opening 41 registering substantially with the opening 36, and is provided with upper and lower guide channels 42 and 43 adjacent the edges of this opening 41. The lower channel 43 is slotted at the bottom for communication with the secondary channel 44 below it, which serves to guide a reciprocating bar 45 carrying a yieldable tooth or dog 46 in position to travel through the channel 43.

A flexible belt 50, preferably of thin sheet metal, extends through the channels 42 and 43. This belt includes apertures 51 at regular intervals, and registered with each aperture there is secured to the face of the belt a slide holder 52 comprising a sheet metal frame having an aperture 53 substantially registering with the aperture 51 of the belt, and having its upper and lower edges turned over to form channels 54 and 55. Each slide holder 52 is secured to the belt 50 by spot-welding, or by other convenient means, which engages only the middle portion of the holder with a limited area of the belt so as not materially to impair the flexibility of the latter, and the ends of the belt are joined together as by the hinge connection shown at 56. A curved track for the belt 50 is shown at 57 in Fig. 5, with opposite ends of the track connected in any suitable manner with the ends of the guide frame 40 at opposite sides of the projector shell 1, so that the track extends around the rear end of the shell and provides a continuous circuit in which the belt 50 is slidably movable. At intervals corresponding to the spacing of the openings 51, the belt is provided with driving lugs or teeth for engagement by the yielding dog 46 of the bar 45, and, as a matter of convenience, these lugs are formed on the rear faces of the slide holders or frames, as shown at 58, and the belt 50 itself has clearance notches 59 through which these lugs project for engagement by the driving tooth 46. Thus the movement of the bar 45 in one direction shifts the belt 50 by a measured distance sufficient to move one of the slide holders 52 out of registration with the opening 36 in the partition 34 and to bring the next slide holder into such registration for projection of a transparent slide carried by it. Each slide may consist of a pair of cover glasses with a transparent film between them, or of suitable pasteboard panels between which a film is similarly held, and in either case the slide is dimensioned to fit into the channels 54 and 55 of the holder 52 and to be frictionally held therein with its picture area registered in the aperture 53 of the holder 52. Such a slide is shown at 60 in Fig. 4 with its picture area indicated at 61.

The automatic actuation of the slide-shifting bar 45 is accomplished by means of the electric motor 7 supported in the base 4 and shown as combined with a housing 65 which encloses any suitable speed reduction gearing. The slow speed shaft 66 extends from the housing 65 and carries a crank disk 67 having a crank pin 68 which engages in a longitudinal slot 69 of a link 70. The link is connected to the lower end of a lever 71 fulcrumed at 72 on a support secured to the base 4 and the upper end of the lever is reduced at 73 to engage loosely in an opening 74 in the end portion 75 of the slide bar 45. Thus, the rotation of the crank disk 67 actuates the link 70 and oscillates the lever 71 to reciprocate the bar 45. By virtue of the slot 69, the movement of the link 70 is rendered intermittent, being delayed while the crank pin travels the length of the slot twice in each revolution of the disk 67. With the arrangement shown, the active movement of the bar 45 for shifting the slide holders is accomplished as the crank pin 68 is traveling through the lower portion of its curved path, as seen in Fig. 4; then as the crank passes the horizontal diameter of the disk 67 it rides through the slot 69 until it strikes the opposite end of the slot. Thereafter the crank pin drives the link 70 in a direction to cause the return or idle stroke of the bar 45 and again traverses the slot 69 before commencing the active stroke of said bar. Thus, the provision of the slot 69 prolongs the interval through which the belt 50 and the slide holder 52 remain stationary for display of the slide which is registered with the lens system and light source of the projector; but with each revolution of the crank disk 67 the bar 45 is given a full reciprocation and the next succeeding slide on the belt 50 is presented and displayed.

Preferably, to preserve a neat appearance, the track 57 is provided with a cover 77 fitting around the outer surface of the belt 50 as it is mounted in the track, and loosely enclosing the belt with sufficient clearance for the several slide holders or frames 52 as they stand in substantially tangential relation to the belt 53 when it traverses the curved portion of the track 57. This cover 77 may be of sheet metal and sufficiently yielding to be easily removed so as to afford access to the belt and to the holders 52 to permit any one or more of the picture slides to be removed from the holders and replaced with other pictures to alter the display program.

In view of the tiltable mounting of the projector unit 1 on the hollow housing 2, the conductors 80 for the lamp 9 extend in channels in the side walls of the unit 1, ending in flat annular terminals 82 which encircle the pivots 3, as seen in Fig. 6; and similar flat annular terminals 84 are disposed in contact with the terminals 82 and are connected with lead wires 85 and 86, shown in Fig. 2, by which the current is supplied to the lamp 9. Thus, when the projector shell 1 is tilted about its pivotal mounting, the terminals 82 merely rotate against the terminals 84 without interruption of the circuit.

To insure satisfactory projection of the image onto the screen 6, the mirror 5 is silvered on its outer surface, thus avoiding any double reflection; and the mirror is carried in a frame 90 having a lug 91 at its upper end engaged in an opening formed in a boss 92 which is cast on the inner surface of the housing 2, while the lower end of the frame 90 is provided with a brace arm 93 which may be slotted for engagement with a clamping screw 94, thus permitting the mirror to be adjusted accurately to the proper angle in the assembly process.

As seen in Figs. 1 and 6 the lamp housing has a top wall formed with double louvres 95 which allow the escape of heated air without permitting the emission of light, and the back wall is made with single louvres which provide additional ventilation. The hollow base 4 rests on rubber buttons 4ª which allow air to enter under the edges of the base, and an opening 4ᵇ in the top wall of the base permits the air to circulate upwardly through the housing 2 and projection unit 1.

The upward tilting range of unit 1 is limited by stop bosses 97 on its side walls which engage the upper edges of the housing 2, and in the downwardly tilted position the forward edge of the top wall of the unit 1 is stopped against the upper edge of the front wall of housing 2 as seen in Fig. 2. Friction springs fitted with felt or rubber pads 98 bear against the sides of the unit 1 to hold it at any position in its tilting range.

Figure 5:
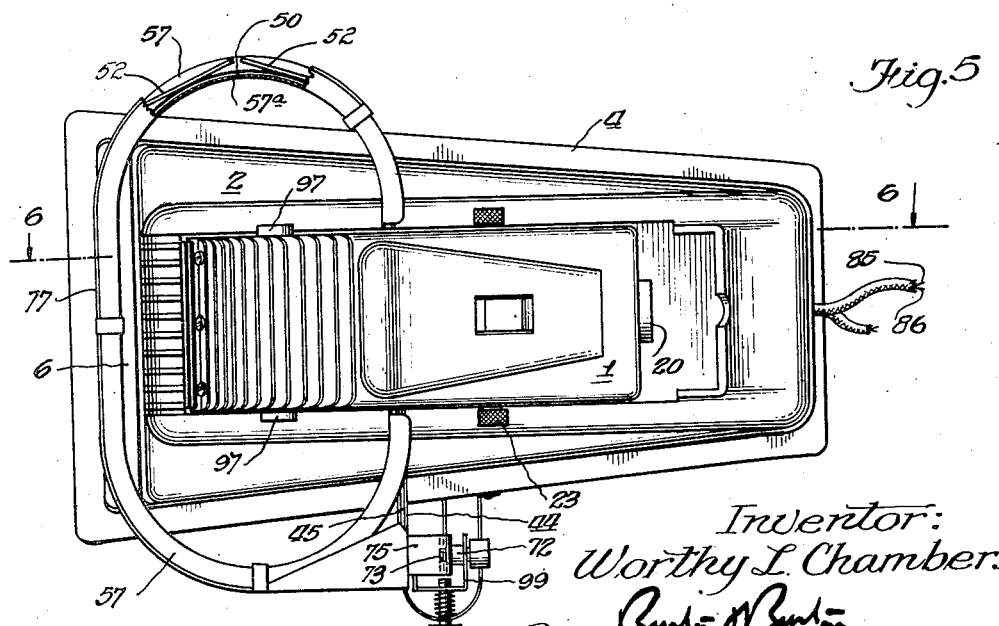
Fig. 5 is a top plan view with the parts positioned as in Fig. 1.

To insure accurate positioning of the slides 60 by the feed bar 45, the fulcrum 72 of lever 71 is carried on a pivotally mounted frame 99 adjustable by means of a screw 100, as shown in Figs. 4 and 5. The quiet operation of the belt 50 around its track 57 is aided by bearing strips of fabric, cord, or the like secured around the vertical wall of the track at 57ª for contact with the belt 50 as indicated in Figure 6.

Preferably the housing 2 is not attached to the base 4 but merely rests upon it with the rubber feet 2ª engaged in suitably positioned holes in the top wall of the base as indicated in Fig. 1. Thus, if it is desired to operate the projector manually without the aid of the motor 7 the housing 2 is simply lifted off the base 4 and the hole 74 becomes disengaged from the end 73 of lever 71. The feed bar 45 may be actuated by hand, or the entire guide frame 40 and track 57 may be removed to permit individual slides or straight sets of views to be inserted in the slots 35 of the projector unit 1.

I claim as my invention:

1. In combination with a projector which includes a lamp, a condenser lens, a focusing lens, and a housing in which said parts are mounted in operative relation and provided with a slide receiving slot, a hollow base on which said housing is tiltably carried with said slot above the base, a translucent screen disposed in a substantially vertical plane across one end of said base and a mirror in the opposite end positioned to directly receive an image projected by the focusing lens and to reflect such image directly onto the screen when the housing is tilted downwardy toward the mirror, said projector operating to project an image over and beyond said mirror onto a vertical surface when its housing is tilted to approximately horizontal position.

2. In combination with a projector which includes a lamp, a condenser lens, a focusing lens, and a housing in which said parts are mounted in operative relation and provided with a slide receiving slot, a hollow base higher at one end than at the other end, means by which said housing is tiltably carried on said base with the slot exposed outside the base, a translucent substantially vertical screen across the higher end and an inclined mirror disposed opposite the screen at the lower end positioned to receive an image directly from the projector when its housing is tilted downwardly toward said mirror and to reflect such image directly onto said screen, the projector operating to project an image horizontally over and beyond said mirror onto a vertical surface when its housing is tilted to approximately horizontal position.

3. In combination with a projector which includes a lamp, a lens system comprising a condenser and a focusing lens, and a housing in which said parts are mounted in operative relation and provided with a slide receiving slot, a chamber with which the housing is swingably connected, a translucent screen disposed across one end of said chamber in a substantially vertical plane and a mirror in the opposite end positioned to directly receive an image projected by the focusing lens and to reflect such image directly onto the screen when the housing is swung with the axis of the lens system directed toward the mirror, said housing being adjustable at will into horizontal position to project an image past the mirror and onto a vertical surface outside the chamber.

4. In a projector, a focusing lens, a tube in which it is mounted and a support for said tube in which it is slidable in the direction of its axis, a housing by which the support is carried, and means for adjusting said tube comprising a lever fulcrumed on the housing with one end of said lever engaging the tube, a second lever fulcrumed coaxially with the first, an operating knob having a shaft rotatably mounted in the second lever with a crank arm on said shaft engaging the first lever whereby rotation of the knob actuates the crank to swing one lever relatively of the other and shift the tube through a limited distance and bodily arcuate movement of the knob with said levers actuates the levers together for shifting the tube through a greater range.

5. In a projector, a housing, a lamp and supporting means therefor within the housing, a two-part condenser lens and a carrier therefor comprising a two-part panel having a circular opening and separable at a substantially diametral line, each of said two parts having grooved lugs of limited circumferential extent upstanding from its opposite faces to engage the edges of the lenses respectively for supporting them in correctly spaced relation, spring wire clips holding the two parts of the panel together and guideways in the housing walls engaging opposite edges of the panel to position the panel therein.

6. In combination with a projector having a slide-receiving space, a curved fixed track disposed with its opposite ends adjoining said space at opposite sides thereof, an endless belt extending around the track and through said space, a plurality of holders for transparent slides carried by said belt, each holder comprising a frame with its ends open toward adjacent holders and with opposed channels extending longitudinally of the belt to engage opposite edges of a slide, said frame being attached to the belt at a limited area at the middle of the length of the frame, whereby each frame assumes a tangential relation to the belt in traversing a curve of said track and the open ends of its channels are exposed clear of the adjacent frames to facilitate removal or insertion of a slide.

7. In the combination defined in claim 6, said track comprising a channel having a fixed inner wall serving as the guiding means for the belt with flanges by and between which said slide-holding frames are guided in their travel, and a removable cover disposed opposite said fixed inner wall in spaced relation thereto and completing the enclosure of the belt and slide holders, the removal of said cover from a curved portion of the track exposing the holders in position for insertion or removal of the slides.

8. The combination of a projector unit which includes a lamp, a condenser lens, a focusing lens, and a housing supporting said parts in operative relation and having a slide receiving space, with a base on which said unit is tiltable on a horizontal pivot, a translucent screen supported on said base in a substantially vertical plane and reflecting means carried by the base, whereby an image may be projected onto said screen in position to be viewed by a person facing said screen when the projector is tilted to direct its beam of light downwardly toward said reflecting means, said unit being tiltable alternatively to a position in which its beam is directed horizontally and away from said screen for projecting a larger image onto a vertical surface at a greater distance from the unit where it may be viewed by the said person without substantially altering his own position.

9. A compact projecting apparatus comprising the combination of a projector unit which includes a lamp, a condenser lens, a focusing lens, and a housing supporting said parts in operative relation and having a slide receiving space, with a base on which said unit is pivotally mounted and including a translucent screen supported on said base in a substantially vertical plane and reflecting means carried by the base whereby an image may be projected onto said screen in position to be viewed by a person facing said screen when the said unit is swung to direct its beam of light toward said reflecting means, said unit being swingable alternatively upon its pivotal mounting to a position in which its beam is directed in a substantially horizontal direction away from said screen for projecting a larger image onto a vertical surface at a greater distance from the unit, said apparatus being small enough to permit said person to look past or over the apparatus so as to view said larger image without substantially altering his own position.

WORTHY L. CHAMBERS.